United States Patent
Johnson

Patent Number: 5,970,149
Date of Patent: *Oct. 19, 1999

[54] COMBINED REMOTE ACCESS AND SECURITY SYSTEM

[76] Inventor: R. Brent Johnson, 10816 E. Newton St., Tulsa, Okla. 74116

[*] Notice: This patent issued on a continued prosecution application filed under 37 CFR 1.53(d), and is subject to the twenty year patent term provisions of 35 U.S.C. 154(a)(2).

[21] Appl. No.: 08/892,982

[22] Filed: Jul. 15, 1997

Related U.S. Application Data

[63] Continuation-in-part of application No. 08/752,249, Nov. 19, 1996.

[51] Int. Cl.$^6$ .............................. G06F 11/00; H04L 9/00; H04K 1/00

[52] U.S. Cl. .................................. 380/49; 380/2; 380/21; 395/183.22; 395/185.1

[58] Field of Search .................................... 380/2, 21, 49; 395/183.22, 184.01, 185.1, 200.54, 186, 187.01, 188.01

[56] References Cited

U.S. PATENT DOCUMENTS

| | | | |
|---|---|---|---|
| 4,182,933 | 1/1980 | Rosenblum | 380/21 |
| 4,310,720 | 1/1982 | Check, Jr. | 178/22.08 |
| 4,430,728 | 2/1984 | Beitel et al. | 364/900 |
| 4,531,023 | 7/1985 | Levine | 179/2 |
| 4,578,531 | 3/1986 | Everhart et al. | 380/21 |
| 4,763,351 | 8/1988 | Lipscher et al. | 379/95 |
| 4,965,804 | 10/1990 | Trbovich et al. | 380/21 |
| 5,179,695 | 1/1993 | Derr et al. | 395/183.07 |
| 5,204,961 | 4/1993 | Barlow | 395/725 |
| 5,237,677 | 8/1993 | Hirosawa et al. | 395/185.1 |
| 5,347,578 | 9/1994 | Duxbury | 380/4 |
| 5,416,842 | 5/1995 | Aziz | 380/30 |
| 5,452,460 | 9/1995 | Distelberg et al. | 395/700 |
| 5,537,554 | 7/1996 | Motoyama | 395/183.22 X |
| 5,550,984 | 8/1996 | Gelb | 395/200 |
| 5,678,002 | 10/1997 | Fawcett et al. | 395/183.01 |
| 5,854,828 | 12/1998 | Kocis et al. | 379/93.317 |

FOREIGN PATENT DOCUMENTS

0474058A2  3/1992  European Pat. Off. ........ G06F 11/00

OTHER PUBLICATIONS

Hamish Butler, "Virtual Remote: the centralized expert.", Hewlett–Packard Journal Oct. 1994.

"New PC: IBM redefines Home Computing with breakthrough split system design . . . " Edge Work–Group Computing Report, V7, p. 10, Sep. 30, 1996.

Primary Examiner—Pinchus M. Laufer
Attorney, Agent, or Firm—Head, Johnson & Kachigian

[57] ABSTRACT

A combined remote access and security system for servicing a secure mainframe central processing unit having a console monitor. A secure dispatch central processing unit for receiving problem reports concerning the mainframe central processing unit is in communication with the console monitor. A field engineer's central processing unit is in communication with the dispatch central processing unit. A data encryption key is randomly generated and transmitted from the dispatch central processing unit to both the field engineer's central processing unit and the console monitor. The field engineer central processing unit is in communication with the mainframe central processing unit wherein data transmitted from the field engineer's central processing unit is encrypted and wherein the encrypted data is decrypted at the mainframe console monitor.

12 Claims, 15 Drawing Sheets

Process at Customer Site Monitoring for Alerts  FIG. 3A
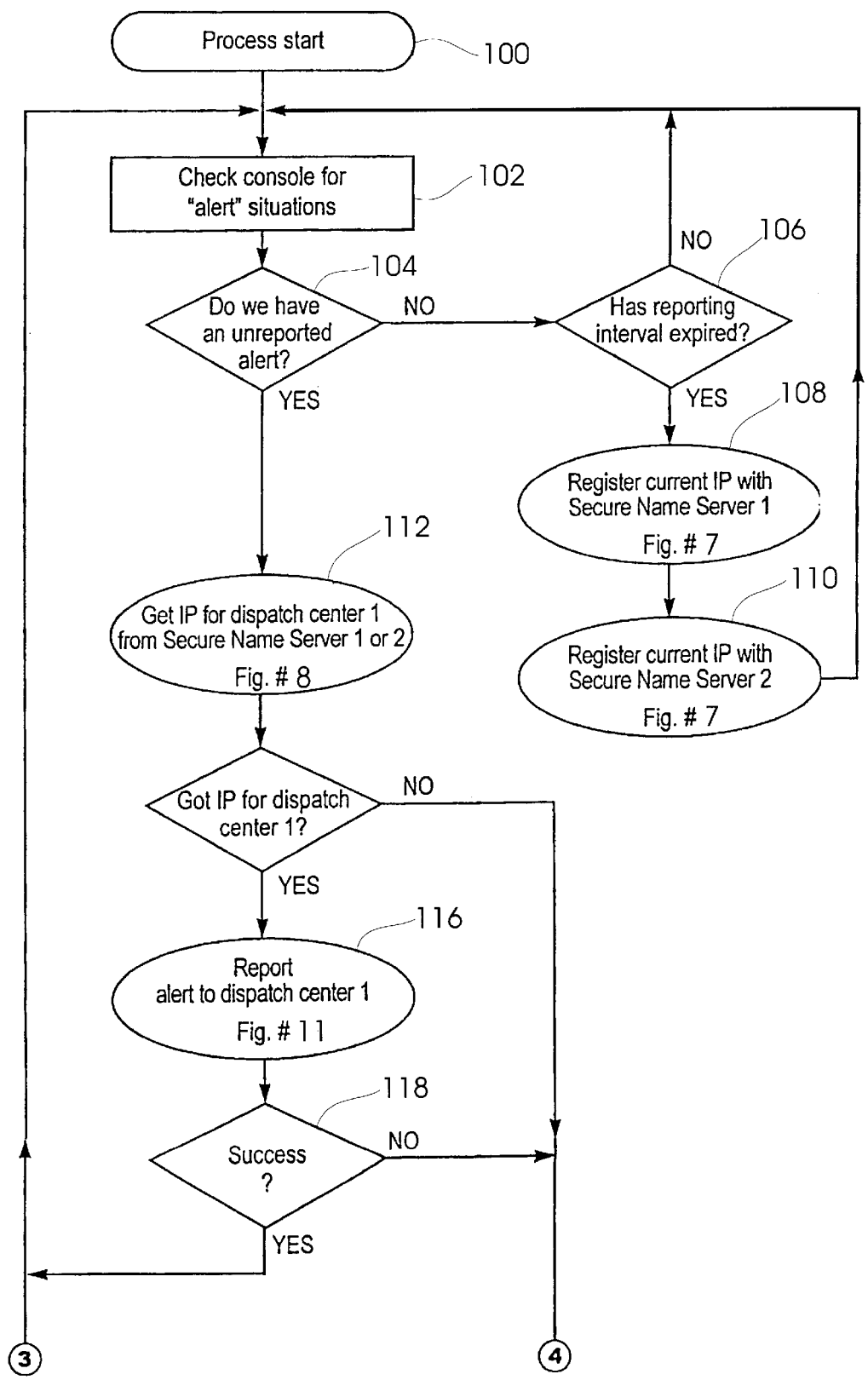

Dispatch Center Handling an Incoming Alert from a Customer Site

Process Remote Support Person Follows to Handle Problem Reports

Dispatch Center Invalidating Remote Support Person's Password at Customer Site

Process to Register Machine with a Secure Name Server  FIG. 7

Process to Obtain an IP Address from
Secure Name Server 1 or Secure Name Server 2 for Dispatch Center

**Process to Obtain an IP Address from
Secure Name Server 1 or Secure Name Server 2 for Customer Site**

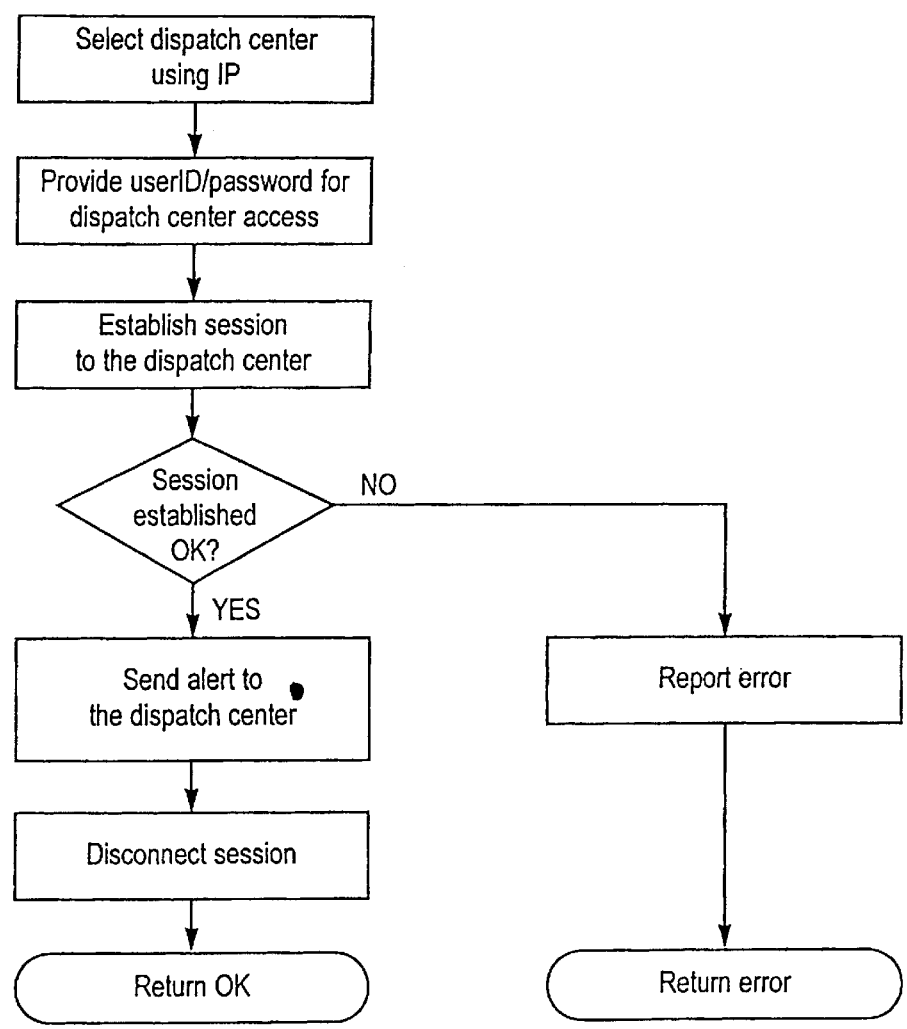
Process to Report an Alert to a Dispatch Center  FIG. 11

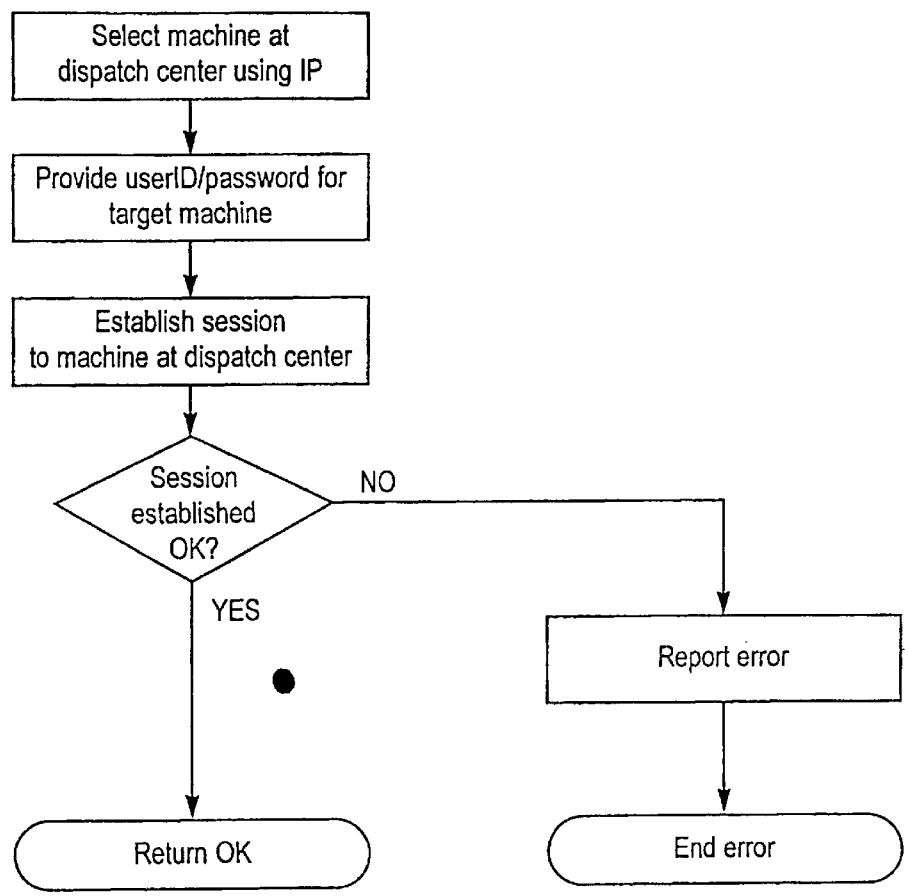
FIG. 12 Connection Process to Dispatch Center Machine

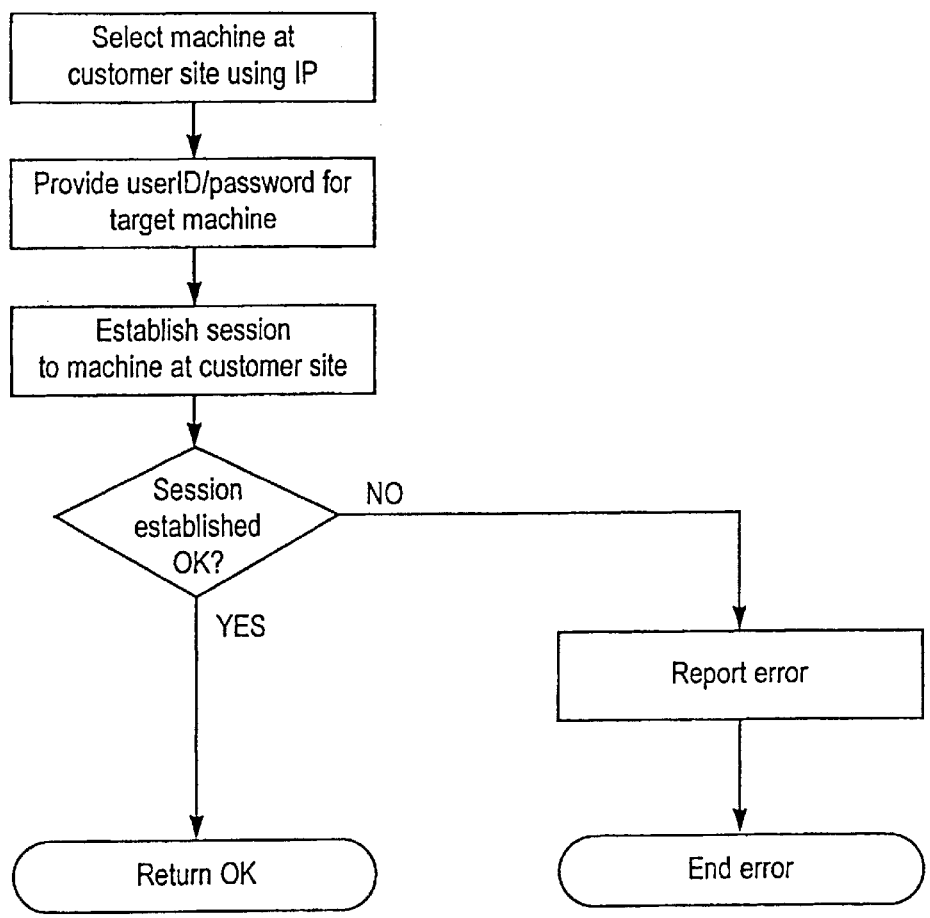
Connection Process to Customer Site Machine    FIG. 13

COMBINED REMOTE ACCESS AND SECURITY SYSTEM

This is a continuation-in-part of U.S. patent application Ser. No. 08/752,249, filed Nov. 19, 1996, and entitled COMBINED REMOTE ACCESS AND SECURITY SYSTEM.

BACKGROUND OF THE INVENTION

1. Field of the Invention

The present invention relates to a system that will provide remote access to allow servicing of a mainframe computer site while at the same time providing for security and integrity of the mainframe computer installation. In particular, the present invention is directed to a system wherein service and maintenance of the mainframe computer system is controlled and monitored from a remote location and service on the mainframe computer system may be performed by a remote support person at a further remote location.

2. Prior Art

Current mainframe processing environments use an operator console to display messages about the system. These messages are monitored and any problems are noted. Programmers and other technicians may then become involved in solving a problem. The problem may be beyond the operations staff's ability to handle.

The mainframe computer system may be serviced and monitored from a remote location. Remote support of mainframe computer installations is becoming increasingly important. This includes both remote monitoring and service support of mainframe computer systems. Businesses have been established which are capable of monitoring and maintaining a wide variety of mainframe computer installations.

From time to time, when problems are found, it is necessary for a technician, field engineer, or remote support person to have access to the mainframe computer system. A technician or field engineer can work on the problems on site at the mainframe installation. With high speed, broad band communications, it is possible for a remote support person or field engineer to diagnose and solve mainframe computer problems from a remote location by communication from a personal computer. Accordingly, the remote support person or field engineer may be at any location. These technicians are increasingly specialized and require wide access to the mainframe computer installation.

Moreover, it is increasingly a trend for employees, including those at mainframe computer installations, to work from their homes on personal computers. In this case, the employees' home computers must be connected to the mainframe computer installations.

At the same time, the computer mainframe installation must retain its security and integrity. In the past, while limited access and "firewalls" have sometimes been employed to maintain security, the field engineer or remote support person needs wide access to the mainframe computer to diagnosis and solve the problems.

Typically, the dispatch control center is located in a secure location. This dispatch control center may be at the same physical premises as the mainframe customer site or may be at a separate location remote from the mainframe. The remote support person, however, is often times at an unsecured location and may operate from a laptop or other unsecured central processing unit machine. Additionally, the mainframe computer business has only limited controls over the field engineer. For example, a disgruntled remote support person or field engineer with wide access to the mainframe computer system could cause considerable problems.

With both the dispatch control center and the support person at remote locations from the mainframe computer center, the channels of communication are important. While secure transmission lines are possible to establish, these are expensive over long distances. Additionally, the support person may be mobile.

The development of personal computers, modems (modulator/demodulator devices) and data connections has allowed the growth of many types of computer networks. The Internet, a somewhat public network of networks, has become an increasingly useful pathway for computer communication. There is, however, a concern about the security and integrity of the Internet pathways.

One solution to security on the Internet has been the encryption of data to be transmitted. One type of encryption uses a single "key" which the sender and recipient must keep secret. Another type of popular encryption uses "public-private keys." The first is a public key made available to anyone. The second is a "secret key" which the user must not allow anyone else to see. The public and private keys work in tandem. If the secret key is stored on a computer system, it is, however, vulnerable.

The same security issues and concerns may also exist on corporate intranets and private networks.

Accordingly, the present invention is directed to an arrangement where a mainframe or mainframes are secured at a customer site and wired to a personal computer with software for console monitoring. The console monitor is in communication with a secure dispatch control center location. The dispatch control center, upon being alerted of a problem, will contact a support person to diagnose and solve the particular problem. A data encryption key is randomly generated and transmitted from the dispatch control center to both the support person's central processing unit and to the console monitor of the mainframe.

It is a further object and purpose of the present invention to provide a remote access and security system using data encryption keys wherein a data encryption key is never transmitted or sent between the remote support person's central processing unit and the mainframe installation.

SUMMARY OF THE INVENTION

In a combined remote access and security system of the present invention, a single mainframe or multiple mainframes are located at a secure location. The mainframe or mainframes are connected to a console monitor central processing unit through a coax or twinax connection.

The console is used to display status messages about the mainframe computer system including errors or critical situations occurring on the computer system. When specified mainframe system alerts or problems occur a warning or alert will be issued. This alert will be communicated from the console to a dispatch control center central processing unit at a remote, secure location.

A dispatcher will monitor any alarm codes received from the mainframe system. The dispatcher will create a trouble ticket for each incoming alarm, assign a field engineer to the problem and call or otherwise contact the field engineer.

Thereafter, the dispatcher will initiate through the dispatch central processing unit, a unique, randomly generated user identification/password pair which is referenced to the assigned problem number. The user identification/password pair is a data encryption key randomly generated by the dispatch central processing unit. The data encryption key is generated from a mathematical algorithm and will be a randomly generated binary code.

The identification/password encryption key is transmitted in two separate transmissions over two separate paths. The data encryption key is communicated from the dispatcher's central processing unit to the field engineer's central processing unit. Additionally, the dispatch central processing unit will also transmit the data encryption key back to the console central processing unit of the mainframe.

Once the field engineer has been notified and has received the identification/password pair from the dispatch control center, the field engineer will log on and communicate with the console central processing unit.

Data communicated from the field engineer's central processing unit to the console central processing unit is encrypted with the identification/password key. The data is subsequently decrypted upon receipt at the console monitor central processing unit. Importantly, the password/identification pair does not travel over the connection between the field engineer and the mainframe site.

BRIEF DESCRIPTION OF THE DRAWINGS

FIGS. 3A, 3B, 4, 5A, 5B and 6 are flow charts illustrating the sequential steps of the present invention; and FIGS. 7 through 13 illustrate sub processes of those in FIGS. 3 through 6.

DETAILED DESCRIPTION OF THE PREFERRED EMBODIMENTS

Figure 1:
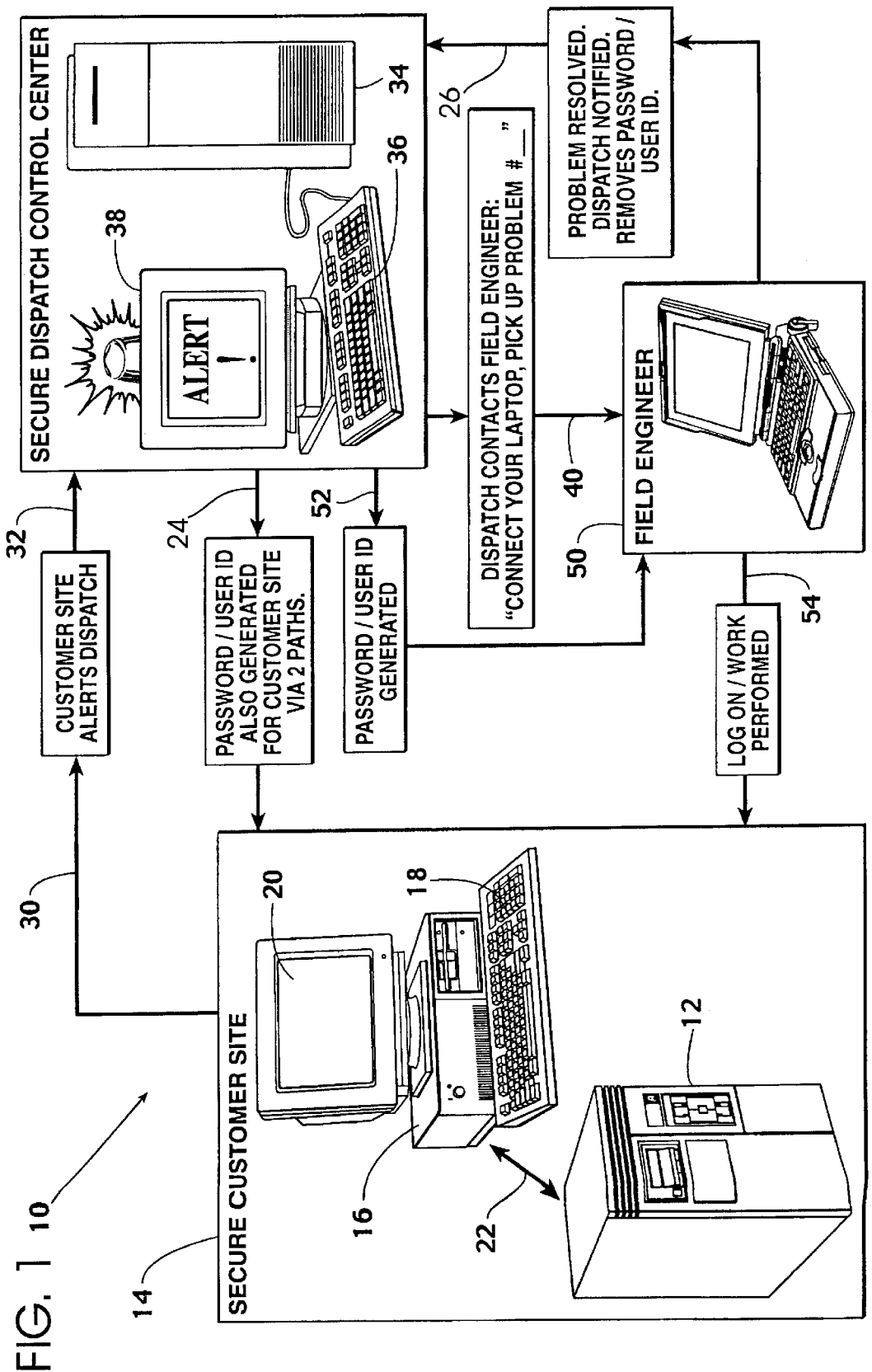
FIG. 1 illustrates a simplified schematic view of a combined remote access and security system as set forth in the present invention.

Referring to the drawings in detail, FIG. 1 illustrates one preferred embodiment of a schematic diagram of a combined remote access and security system 10 of the present invention.

At a mainframe computer installation, a single mainframe 12 or multiple mainframes are located at a secure location (illustrated by the box 14). In many industries and businesses, large numbers of transactions are processed on an around-the-clock basis. Because of this demand, multiple mainframe central processing units are utilized within a secure computer complex. Access may be limited by physical measures, such as locked rooms, finger printing, and the like.

The mainframe or mainframes are connected to a console monitor central processing unit 16 which typically includes a keyboard 18 and display 20. The console 16 can be connected with the mainframe or mainframes in various ways, such as, by a coax or twinax connections 22.

The console 16, in the present situation, may employ a Windows NT™ operating system or other known operating systems. The operating system will have an application program or programs which is in a client-server format and provides console monitoring and console automation features. The application program watches or monitors the console for certain conditions.

The console 16 is used to display status messages about the mainframe computer system and allows the operations staff to control the operations of the mainframe or mainframes. Types of messages displayed may be about errors or critical situations occurring on the computer system. Examples of problems noted may be a tape drive fault or a fault in a chip on a board.

In today's environment, a single console may be responsible for multiple mainframe computers running multiple computer operating systems.

In specified mainframe system alerts, events or problems, the console will issue a warning or alert. This alert will be communicated from the console 16 through a modem and through a communications path, shown by arrow 30, to a dispatch control center, indicated by box 32. In the present embodiment, the communications path may be across the public Internet network. Each computer or machine will have a distinct Internet protocol address. Other communications paths, such as corporate intranets or private networks, are possible within the teachings of the present invention.

In the present embodiment, the secure dispatch control center 32 is located remote from the mainframe site, although the teachings of the invention apply if the dispatch center is at the same location.

The dispatch control center 32 is ordinarily at a secure location. Thus, access to the computer is limited by physical measures such as locked rooms, fingerprinting and the like. Additionally, access to the dispatch central processing unit 34 may require passwords prior to log on procedures. Typically, the dispatch central processing unit 34 includes a keyboard 36 and a display 38. The dispatch central processing unit 34 will be running a client side version of the application program running on the console monitor 16, as previously discussed.

A dispatcher (not shown) will monitor incoming alarm codes received from the mainframe 12. If an alert occurs, it will appear on the display screen 38 of the dispatcher. Upon receipt of an alarm code, it will display in a list on the display screen 38.

The dispatcher will create a trouble ticket for each incoming alarm in the problem tracking program. Alternatively, the procedure to create a problem or trouble ticket might be automated.

Once this has been completed, a field engineer or other remote support person will be assigned to the problem and will be called or otherwise contacted. In one such procedure, the dispatcher will call the field engineer or remote support person via telephone over a voice line. This connection is shown by arrow 40. The field engineer will be assigned a problem number for the incoming problem on the mainframe computer.

Thereafter, the dispatch control center will initiate a utility software program on the dispatch central processing unit 34 which will create a unique, randomly generated user identification/password pair which is referenced to the assigned problem number. In the FIG. 1 embodiments, the user identification/password pair is a data encryption key randomly generated by the dispatch central processing unit 34.

In the present case, the data encryption key is generated from a mathematical algorithm and will be a randomly generated binary code of 128 bits. The data encryption key is also time limited so that after a certain period of time, it will automatically expire. For example, the data encryption key may be valid for a period of 24 hours, after which it is no longer valid.

The identification/password pair is transmitted in two separate transmissions in two separate paths. The data encryption key is communicated and transmitted from the dispatch central processing unit to a remote support person or field engineer central processing unit 50 as shown by arrow 52. The field engineer central processing unit may take many forms, such as a laptop terminal, hand held PC or a desktop computer.

The dispatch central processing unit will also transmit the identification/password data encryption key back to the console central processing unit 16 as shown by arrow 24. The data encryption key is itself also encrypted. The data encryption key is itself decrypted at the field engineer's central processing unit and at the console.

Once the field engineer or remote support person has been notified and has received the identification/password pair from the dispatch control center, the field engineer 50 will log on and communicate with the console central processing unit 16 as shown at arrow 54. The field engineer will be running a client side version of the same application program.

The communication between the field engineer and the console may be made through a public network such as the Internet. The encrypted data is decrypted at the console monitor.

The field engineer or remote support person will input and download the assigned problem number already received from the dispatch control center 32. The field engineer will thereby retrieve the problem details from the console. The field engineer will, thus, be connected to the mainframe site. Importantly, the password does not travel over the connection between the field engineer central processing unit 50 and the mainframe site 14.

Once connected to the mainframe computer site, the field engineer or remote support person retrieves necessary information through the console central processing unit 16 via the coax 22 connection to the mainframe 12. The field engineer, thus, has access to the mainframe and will endeavor to solve the problem presented.

Once the problem is resolved, the field engineer will notify the dispatch control center 32 that the problem has been resolved as shown at arrow 26. This may be done in a number of ways. This may be done by telephone through voice line. Alternatively, the field engineer may communicate through the field engineer's central processing unit 50 through a communications line back to the dispatch central processing unit. This may also be performed through the Internet.

The dispatcher closes the problem in the problem tracking system. Thereafter, the unique identification/password pair is invalidated so that there is no longer access to the mainframe computer. The dispatcher closes the problem in the dispatch central processing unit database, which then removes the identification/password pair from the console monitor 16 at the mainframe site.

Each of the computer communications may be made through a public network such as the Internet. The data connection from an unsecured terminal/location is at all times secured by the present invention.

Figure 2:
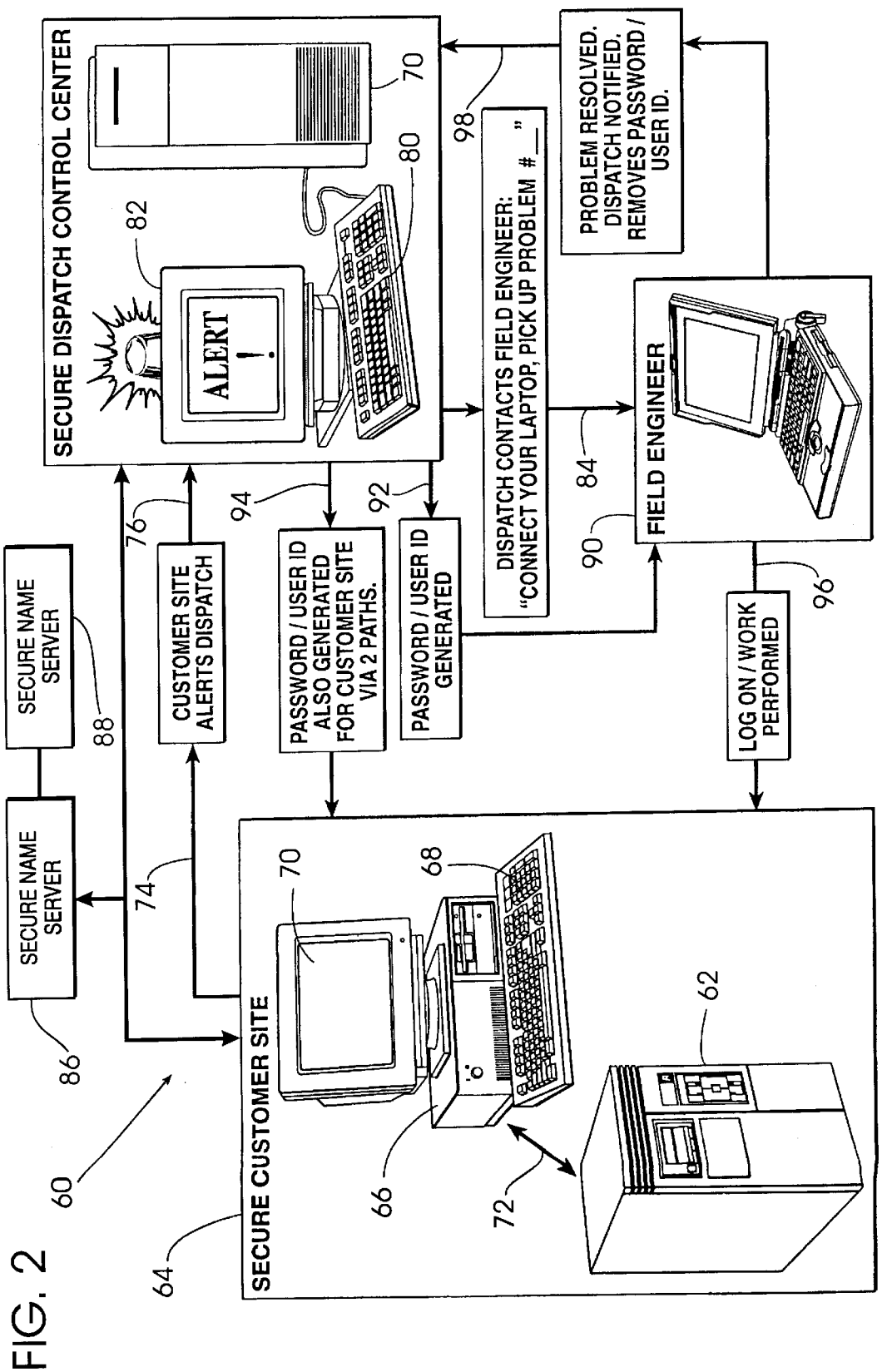
FIG. 2 illustrates a schematic view of an alternate embodiment of a combined remote access and security system as set forth in the present invention.
Figure 3B:
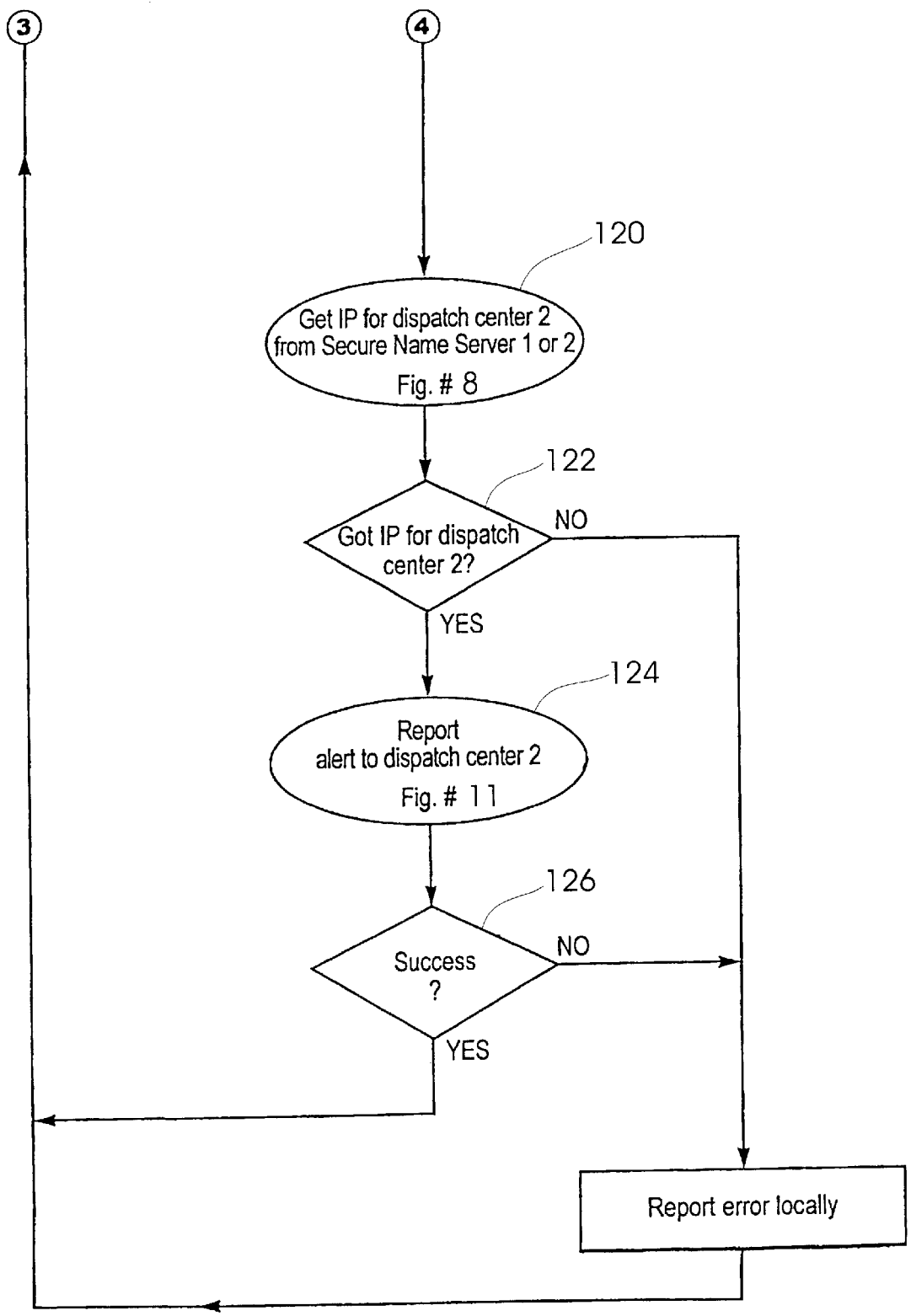

FIG. 2 illustrates an alternate embodiment 60 wherein the Internet protocol address are provided dynamically from a secure name server central processing unit.

At a mainframe computer installation, a single mainframe 62 or multiple mainframes will be located at a secure location (illustrated by box 64). The mainframe or mainframes are connected to a console monitor central processing unit 66 which typically includes a keyboard 68 and a display 70. The console 66 can be connected with the mainframe or mainframes in various ways, such as by coax or twinax connections 72.

Alerts, events or problems will be noted by the console which will issue a warning or alert. This alert will be communicated from the console 66 through a modem and through a communications path, shown by arrow 74, to a dispatch control center 76. The dispatch control center includes a dispatch central processing unit 78 having a keyboard 80 and a display 82. The dispatch central processing unit 78 will be running a client side version of the application program running on the console monitor. If an alert occurs at the console monitor, it will be transmitted and appear on the screen of the dispatch central processing unit. Upon receipt of an alarm code, it will display in a list on the display screen 82. The dispatcher will create a trouble ticket for each incoming alarm in the problem tracking program. Alternatively, the procedure to create a problem or trouble ticket might be automated.

A field engineer or other remote support person will be assigned to the problem and will be called by a telephone or otherwise contacted which is shown by arrow 84. Thereafter, the dispatch control central processing unit 72 will communicate with a secure name server 86 or 88. The secure name server may be located on the premises of the dispatch control center or may be remote therefrom. The secure name server will, through a utility software program, generate a unique, randomly generated user identification/password pair. This will be referenced to the assigned problem number. The user identification/password pair is a data encryption key randomly generated. The data encryption key is transmitted in two separate transmissions over two separate paths. The data encryption key is communicated and transmitted from the dispatch central processing unit 78 to a remote support person or field engineer central processing unit 90 as shown by arrow 92.

The dispatch central processing unit will also transmit the data encryption key back to the console central processing unit 68 which is shown by arrow 94.

After the field engineer or support person has been notified and has received the identification/password pair from the dispatch control center, the field engineer will log on and communicate with the console processing unit 68 as shown by arrow 96.

Once the problem has been resolved, the field engineer or support person will notify the dispatch control center that the problem has been resolved. This is illustrated by arrow 98. The dispatcher at the dispatch control center closes the problem in the problem tracking system. Thereafter, the unique identification/password pair is invalidated so that there is no longer access to the mainframe computer site 64. The dispatcher closes the problem in the dispatch central processing unit database which then removes the identification/password pair from the console monitor 68 at the mainframe site.

FIGS. 3 through 13 illustrate the process of the present invention that will provide remote access to allow servicing of the mainframe computer while providing for security and integrity of the mainframe computer installation. The process will be described in relation to the FIG. 2 embodiment with a pair of dispatch control centers. FIGS. 3A and 3B illustrate the initial process at the secure customer mainframe site 14 to monitor for alerts. After the process has been started, as shown at 100, the console will be checked for alert situations illustrated at box 102.

If there is no unreported alert, as at 104, a check will be made to see whether the reporting interval has expired 106.

If the reporting period has expired 106, then the current Internet protocol address (IP) will be registered with a first secure name server, as seen at 108. If the first secure name server does not register the Internet protocol address, then the current Internet protocol address will be registered with the second secure name server as seen at 110.

Returning to box 104, if there is an unreported alert, an Internet protocol address will be obtained for the first dispatch control center from a secure name server central processing unit as shown at 112. The secure name server is a repository of customer sites and their current IP addresses. Once the Internet protocol address has been obtained for dispatch center 1, an alert will be reported to the first dispatch center, as seen at 116.

If the report on the alert has been received, box 118, then the process can continue. If there is no success, then, as shown on FIG. 3B, an Internet protocol address will be obtained for dispatch center 2 from either secure name server, as shown at 120. If an internal protocol address has been obtained for the second dispatch center as shown at 122, the alert will be reported to the second dispatch center as shown at box 124. If the alert is reported as shown at 126, the process will again continue in same manner.

Figure 4:
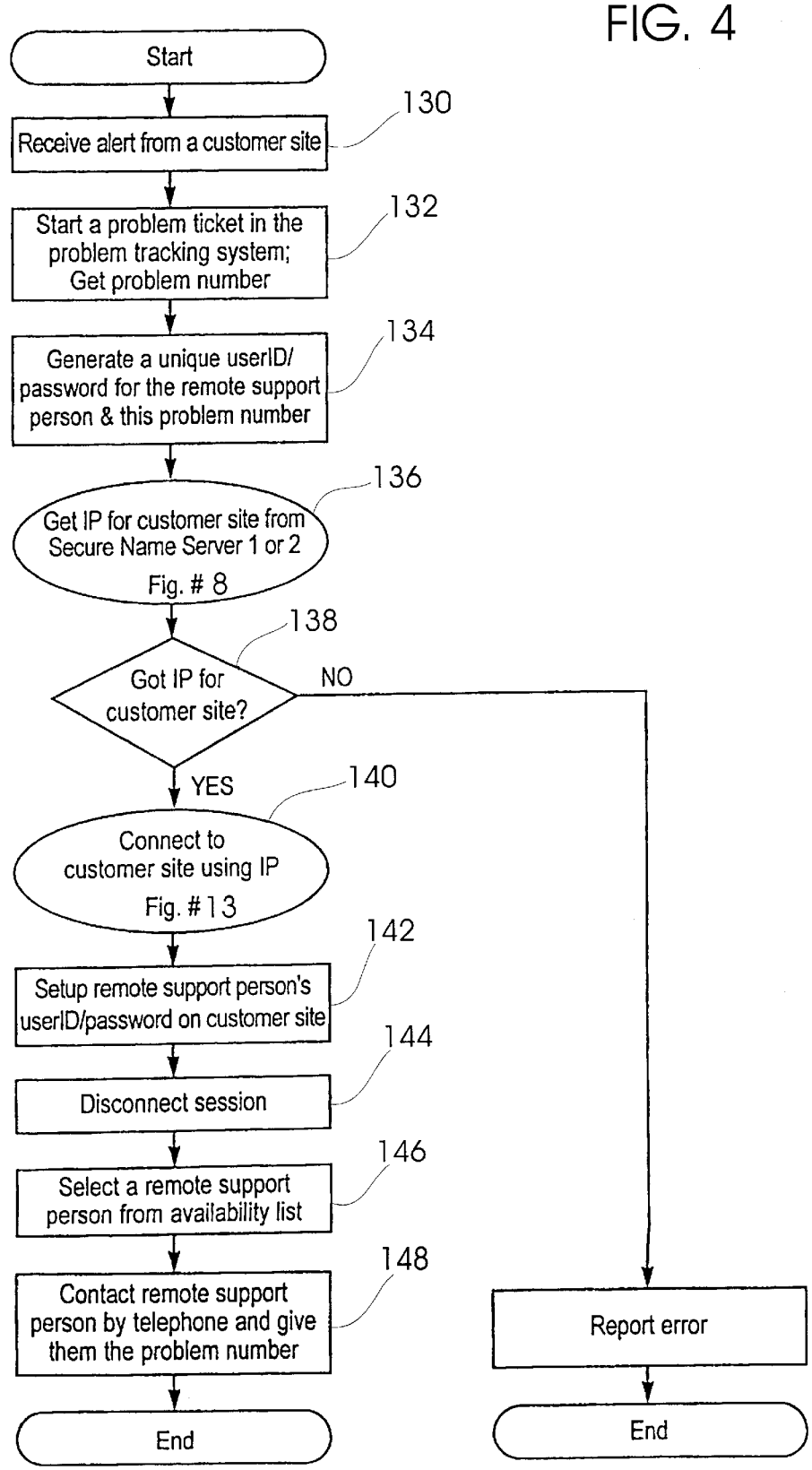

FIG. 4 illustrates the process for a dispatch control center to handle an incoming alert from a secure mainframe customer site. The FIG. 4 process would chronologically follow the process described in FIGS. 3A and 3B. The dispatch control center will receive an alert from the mainframe customer site 130. A problem ticket or problem number will be created in a tracking system as shown at box 132. A unique user ID/password pair for the remote support person will be generated, as at box 134. An Internet protocol address for the customer site will be obtained from a secure name server, as seen in box 136. Obtaining an IP address for the customer site will be explained in detail below.

Once the Internet protocol address has been obtained for the customer site as shown at 138, a connection will be made from the dispatch control center to the customer site as shown at 140.

The remote support person's user ID/password pair will be set up on the customer mainframe site 142. After the connection with the customer site has been disconnected 144, a remote support person will be selected from an availability list 146. The remote support person may be contacted in various fashions, such as by telephone, and given the problem number 148.

FIG. 5 illustrates the process for the remote support person or field engineer that would be employed to handle the problem that has been reported. This procedure would chronologically follow the process shown in FIG. 4.

Figure 5A:
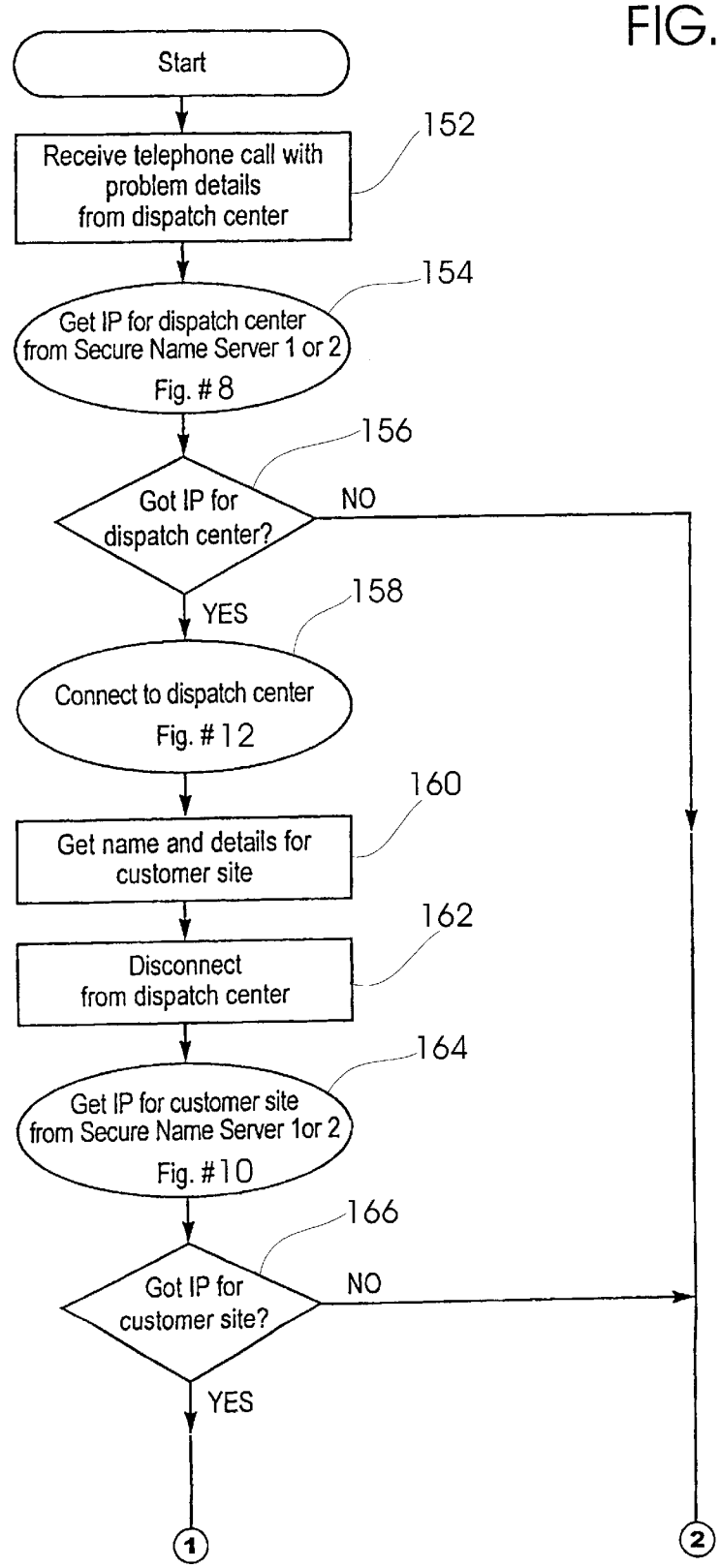
Figure 5B:
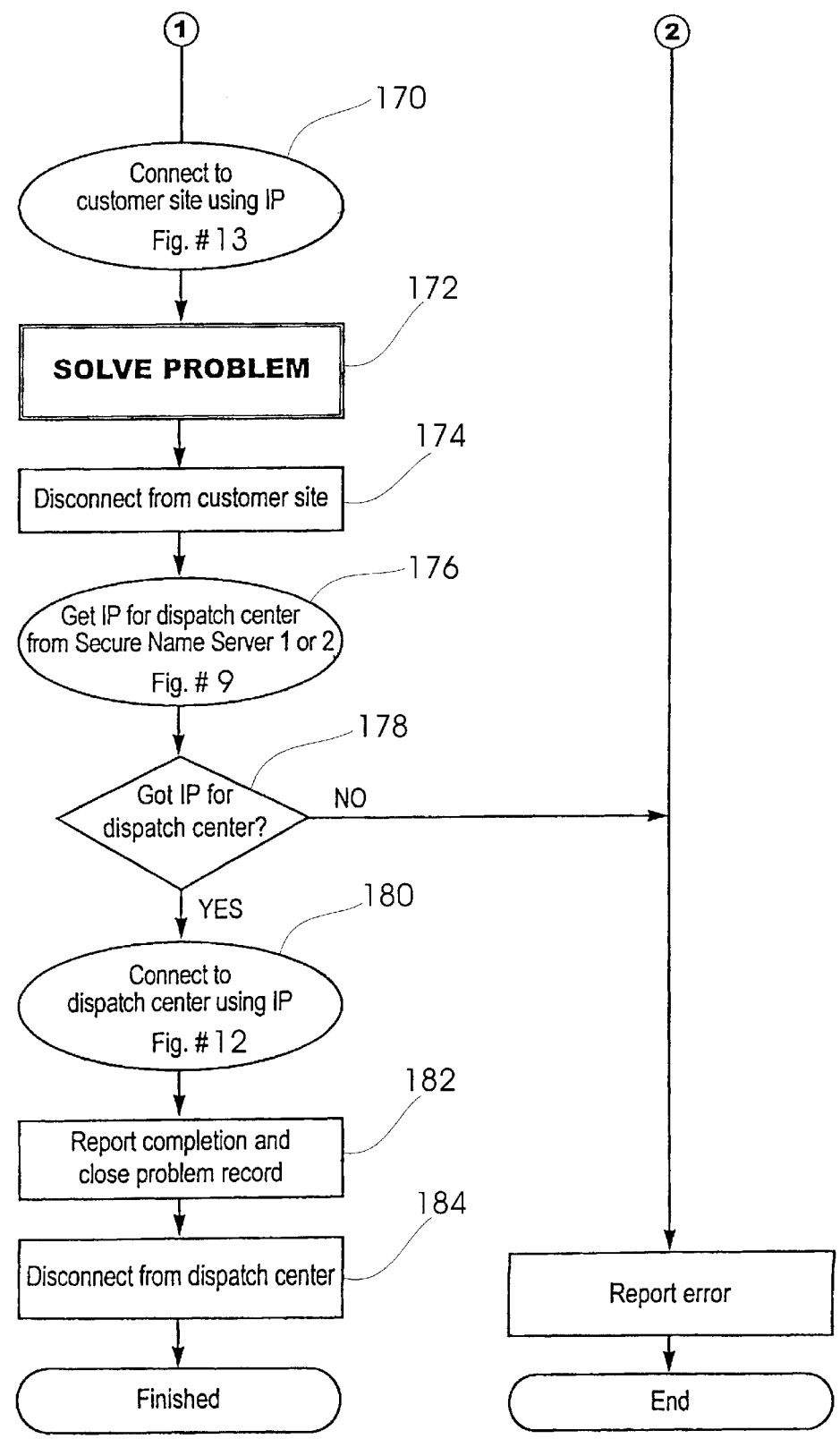

As seen in FIG. 5A, once a problem has been received from the dispatch control center as shown at box 152, an Internet protocol address for the dispatch control center will be obtained from one of the secure name servers 154. This process will be explained in detail below.

Once the Internet protocol address has been obtained for the dispatch control center as shown at 156, a connection will be made to the dispatch center 158. The name and details for the secure mainframe customer site will be provided 160. Thereafter, the remote support person will disconnect from the dispatch control center 162.

An Internet protocol address will be obtained for the customer site from either of the secure name servers 164. Once the Internet protocol address for the mainframe customer site has been obtained 166, the remote support person will connect to the customer site using the Internet protocol as shown at 170. The remote support person or field engineer will be able to work to solve the particular problem as seen at box 172 and, thereafter, disconnect from the mainframe customer site 174.

An Internet protocol address will be obtained for the dispatch control center from either secure name server as shown at 176.

Once the Internet protocol address has been obtained by the support person for the dispatch center 178, the remote support person will connect to the dispatch control center using that Internet protocol address 180. The support person will be able to report completion of the assignment and closing of the problem record 182. The support person will thereafter disconnect from the dispatch center, as shown at 184.

Figure 6:
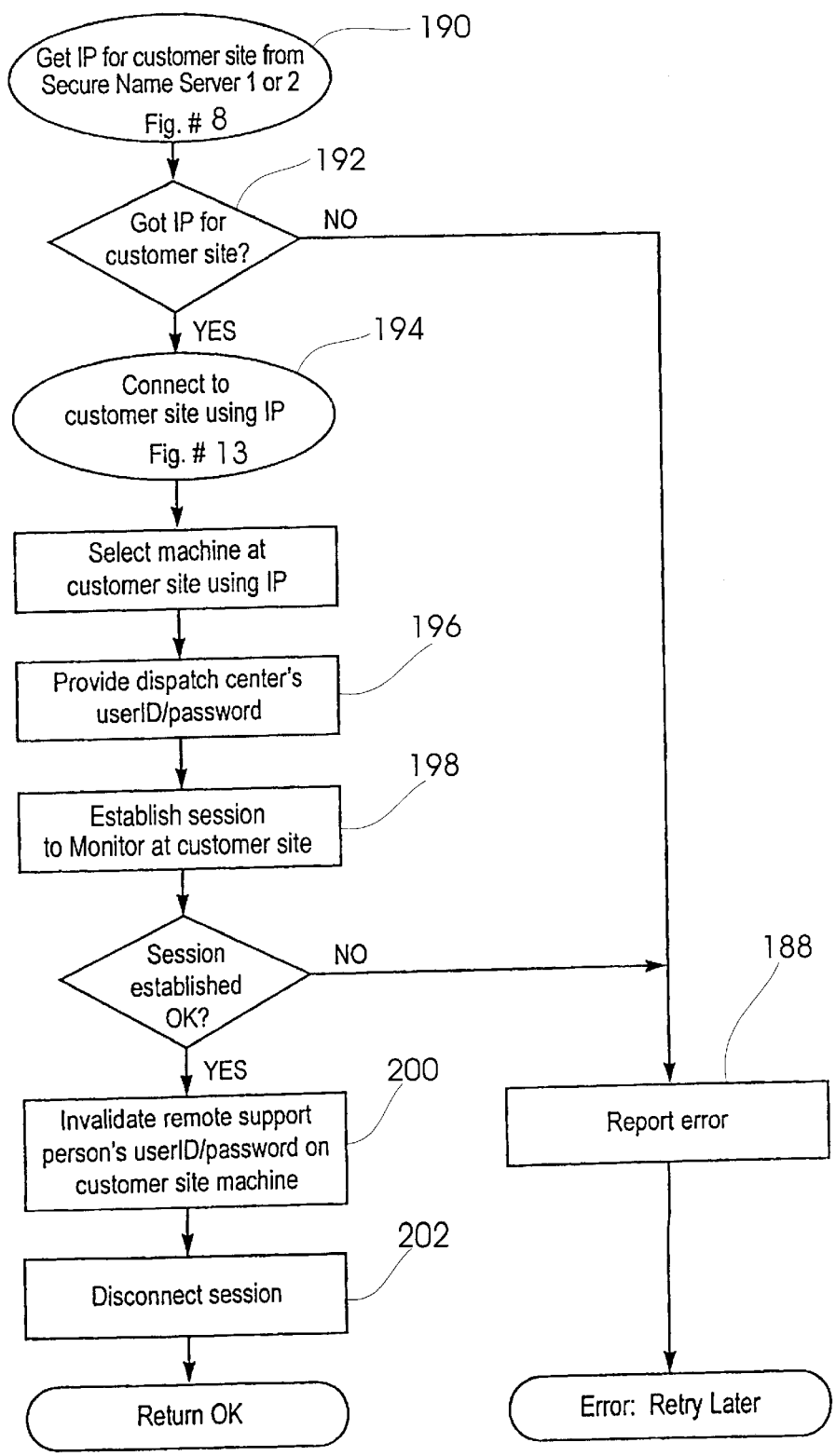

FIG. 6 illustrates the next sequential process in the overall system of the present invention. The dispatch control center will invalidate the remote support person's user ID/password at the secure mainframe customer site.

The dispatch control center will obtain an Internet protocol address for the mainframe customer site from either secure name server, as shown at 190. Once an Internet protocol address has been obtained 192, a connection will be made between the dispatch control center to the console monitor at the customer site using the Internet protocol address as shown at 194. If no Internet protocol address has been obtained, an error will be reported as shown at box 188.

The dispatch center's unique user ID/password will be provided to the console at the customer site, as seen at box 196. A session will thereby be established to the console monitor at the mainframe customer site (198). The remote support person's user ID/password on the customer site console will be invalidated as shown at step 200, following which the session will be disconnected 202.

The remaining processes illustrated in FIGS. 7 through 13 are sub-processes of the foregoing.

Figure 7:
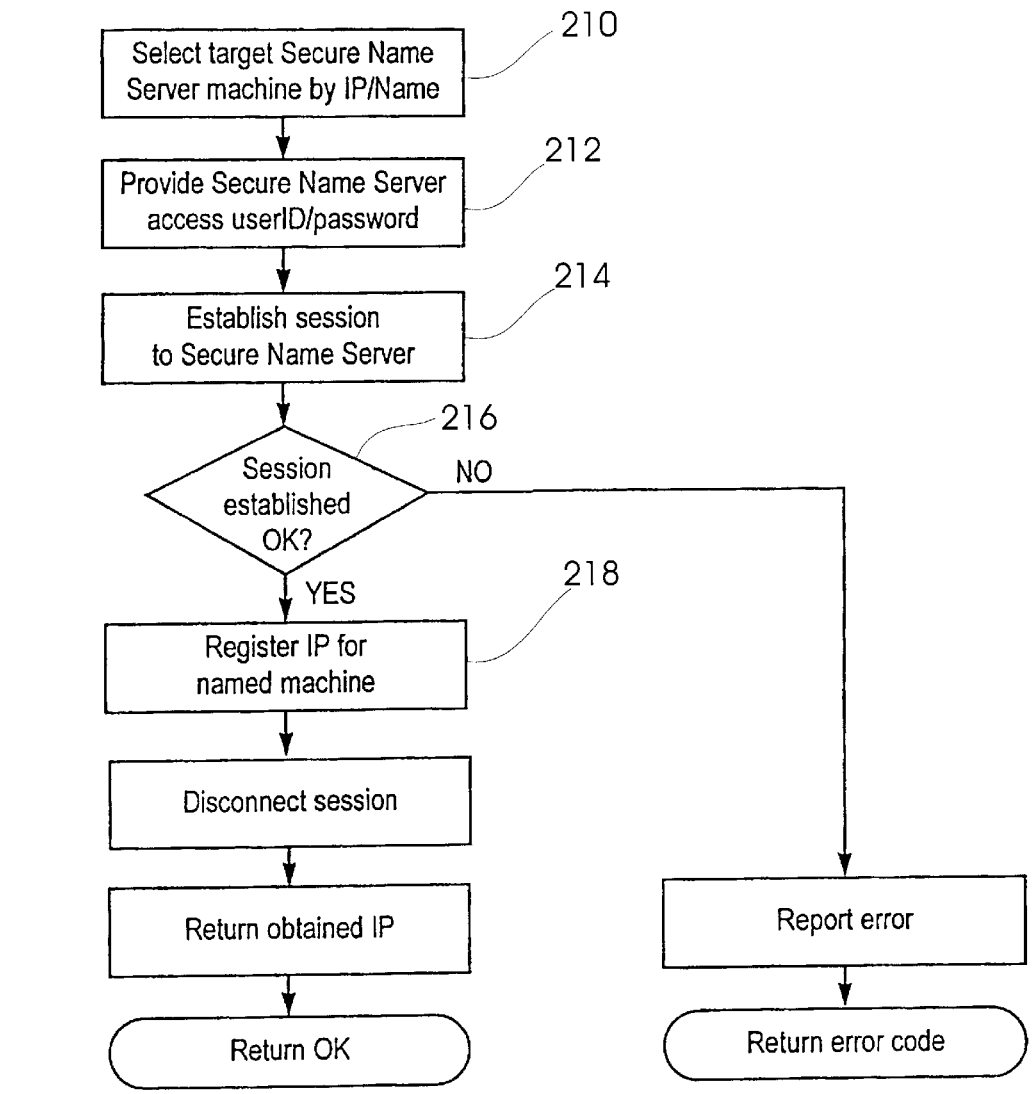

FIG. 7 illustrates the process to register a computer with a secure name server central processing unit. A target secure name server will be selected by its Internet protocol address, as shown at box 210. The secure name server will be provided an access user ID/password pair as seen at box 212. A session will thereby be established to the server as shown at 214. If the session has been established 216, the Internet protocol address for the named machine will be registered 218. This process is also seen in FIG. 3A at boxes 108 and 110.

Figure 8:
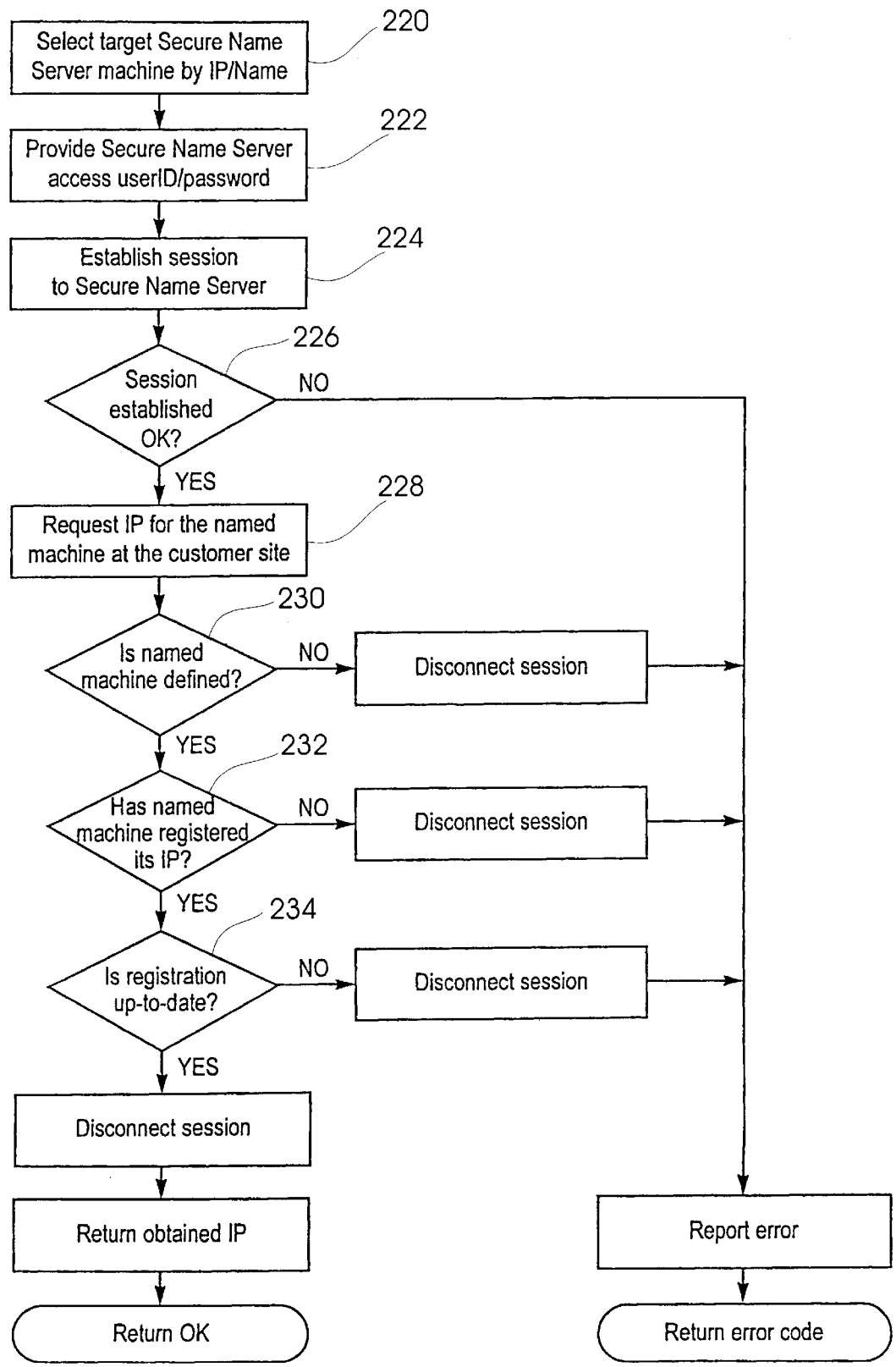

FIG. 8 illustrates the process to obtain an Internet protocol address from a secure name server. This process is shown at box 112 in FIG. 3A. As seen in FIG. 8, a secure name server will be selected by its Internet protocol address, as seen at box 220. The secure name server will be provided with an access user ID/password 222 in order to establish a session 224. Once a session has been established, as shown at 226, an Internet protocol address will be requested for the console monitor 228. If the named computer has been defined 230, a check will be made whether the named machine has its address registered 232, and if the registration is up-to-date 234.

Figure 9:
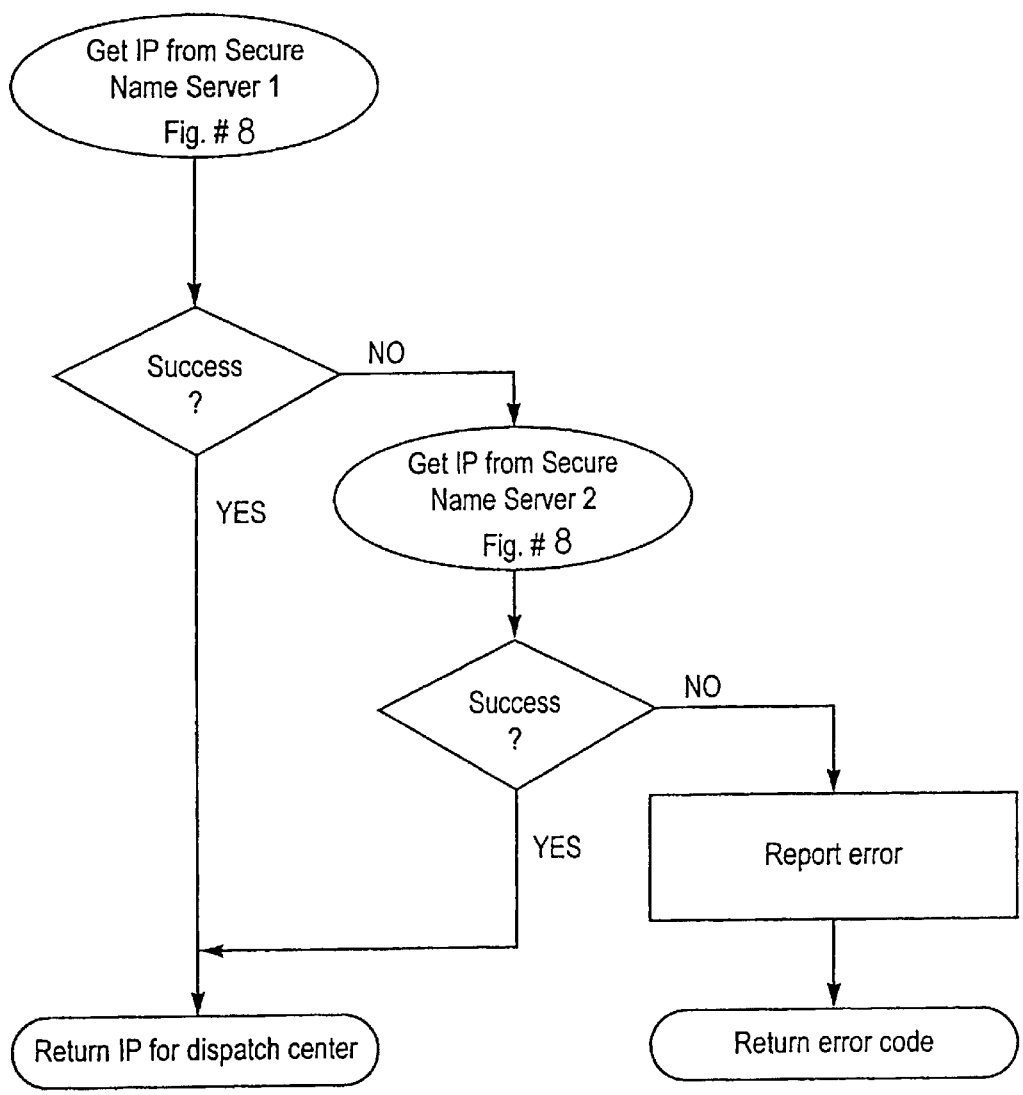

FIG. 9 illustrates the process for either of two secure name servers to obtain an IP address initially from one server and, if not successful, from a second server. This process would be utilized at 176 in FIG. 5B.

Figure 10:
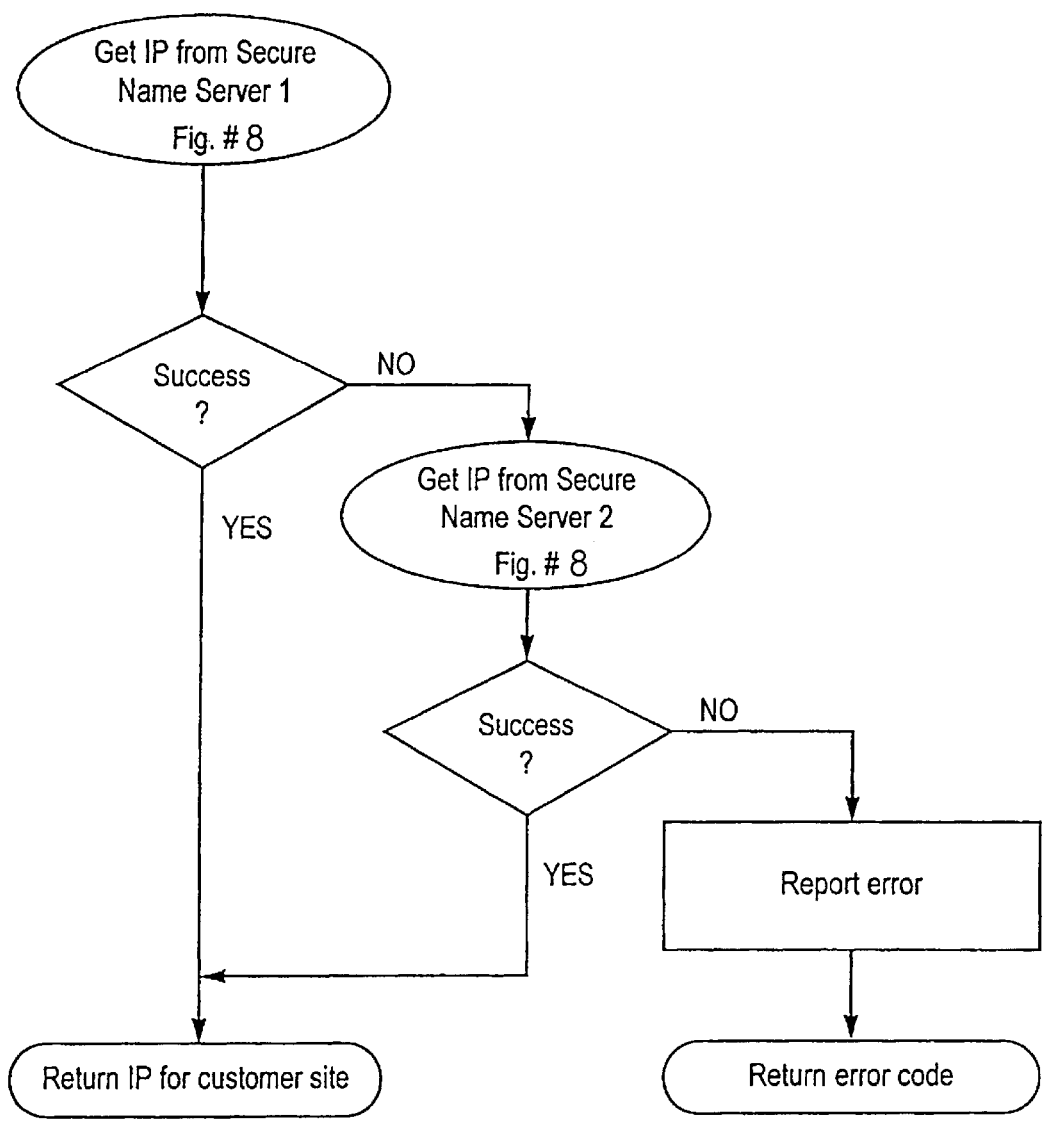

FIG. 10 illustrates a process to obtain Internet protocol address for a mainframe customer site from initially a first server and, thereafter, a second server for the customer mainframe site.

FIG. 11 illustrates the subprocess to report an alert from the mainframe customer site to a dispatch center. This step is illustrated in FIG. 3A at box 116.

The subprocess to connect a remote support person or field engineer to a dispatch center is illustrated in FIG. 12.

Finally, the subprocess to connect to the console at a mainframe customer site using the Internet protocol address is illustrated in FIG. 13.

Whereas, the present invention has been described in relation to the drawings attached hereto, it should be understood that other and further modifications, apart from those shown or suggested herein, may be made within the spirit and scope of this invention.

What is claimed is:

1. A combined remote access and security system for servicing a secure mainframe central processing unit having a console monitor, which system comprises:

a secure dispatch control central processing unit for receiving problem reports concerning said mainframe central processing unit;

communications means for communicating between said mainframe from said console monitor and said dispatch control central processing unit;

a field engineer central processing unit independent from said secure mainframe central processing unit and said secure dispatch control central processing unit, wherein said secure dispatch control central processing unit is remote from said mainframe central processing unit and wherein said field engineer central processing unit is remote from both said mainframe central processing unit and said dispatch control central processing unit;

communication means for communicating between said field engineer central processing unit and said dispatch control central processing unit;

a data encryption key randomly generated and transmitted from said dispatch control central processing unit on separate paths and in separate transmissions to both said field engineer central processing unit and said mainframe central processing unit; and communication means between said field engineer central processing unit and said mainframe central processing unit wherein all data transmitted from said field engineer central processing unit is encrypted and wherein said encrypted data received is decrypted at said mainframe central processing unit.

2. A combined remote access and security system as set forth in claim 1 wherein said data encryption key is time limited to expire after a set time period.

3. A combined remote access and security system as set forth in claim 1 wherein said communications means between said mainframe central processing unit and said dispatch central processing unit, between said field engineer central processing unit and said dispatch central processing unit and between said field engineer central processing unit and said mainframe central processing unit is via the Internet network.

4. A combined remote access and security system as set forth in claim 1 wherein said console monitor includes a central processing unit having monitoring and automation capabilities.

5. A combined remote access and security system as set forth in claim 4 including a plurality of mainframe central processing units connected to said console.

6. A combined remote access and security system as set forth in claim 1 wherein said communications means for communicating between said mainframe and said dispatch control central processing unit and said communications means between said field engineer central processing unit and said dispatch control central processing unit are through a communications path with each said central processing unit has a distinct Internet protocol address.

7. A combined remote access and security system as set forth in claim 6 wherein said Internet protocol addresses are stored in a secure name server.

8. A process to remotely access and service a secure mainframe central processing unit having a console monitor, which process comprises:

communicating a problem with said mainframe central processing unit from said console monitor to a remote dispatch control center central processing unit;

randomly generating a data encryption key at said remote dispatch control center processing unit;

transmitting said data encryption key from said remote dispatch control center on separate paths in separate transmission to both said mainframe central processing unit and to a field engineer central processing unit, wherein said field engineer central processing unit is independent and remote from both said mainframe central processing unit and said dispatch control central processing unit; and communicating between said field engineer central processing unit and said mainframe wherein all data transmitted from said field engineer central processing unit is encrypted and then decrypted at said mainframe central processing unit.

9. A process to remotely access and service a secure mainframe central processing unit as set forth in claim 8 including the additional step of time limiting the data encryption key to expire after a set period of time.

10. A process to remotely access and service a secure mainframe central processing unit as set forth in claim 8 including the additional, initial step of monitoring said console monitor for certain conditions which are identified as problems.

11. A process to remotely access and service a secure mainframe central processing unit as set forth in claim 8 wherein the steps of communicating said problem, transmitting said data encryption key, and communicating between said field engineer central processing unit and said mainframe are done over the Internet network.

12. A process to remotely access and service a mainframe central processing unit as set forth in claim 8 including the additional step of the dispatch control center contacting said field engineer after communicating said problem to said dispatch control center.

* * * * *